No. 688,191.  
I. J. & W. H. MURPHY.  
PAN LIFTER.  
(Application filed Aug. 17, 1901.)

Patented Dec. 3, 1901.

(No Model.)

Witnesses:  
Gladys L. Thompson  
Genevieve Matthews

Inventors:  
I. J. Murphy.  
W. H. Murphy.  
By  
R. S. & A. B. Lacey, Attorneys.

UNITED STATES PATENT OFFICE.

ISAAC J. MURPHY AND WILLIAM H. MURPHY, OF HOPWOOD, PENNSYLVANIA.

PAN-LIFTER.

SPECIFICATION forming part of Letters Patent No. 688,191, dated December 3, 1901.

Application filed August 17, 1901. Serial No. 72,412. (No model.)

*To all whom it may concern:*

Be it known that we, ISAAC J. MURPHY and WILLIAM H. MURPHY, citizens of the United States, residing at Hopwood, in the county of Fayette and State of Pennsylvania, have invented certain new and useful Improvements in Pan-Lifters; and we do hereby declare the following to be a full, clear, and exact description of the invention, such as will enable others skilled in the art to which it appertains to make and use the same.

This invention relates to holders for manipulating pans, plates, and culinary utensils generally, the purpose being the provision of a device of this character capable of easy and ready adjustment to suit different sizes and makes of pans and the like and which will obtain a firm grip thereon and enable the pan to be turned or manipulated in the same manner as if the device were rigidly attached thereto and formed a permanent part thereof.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
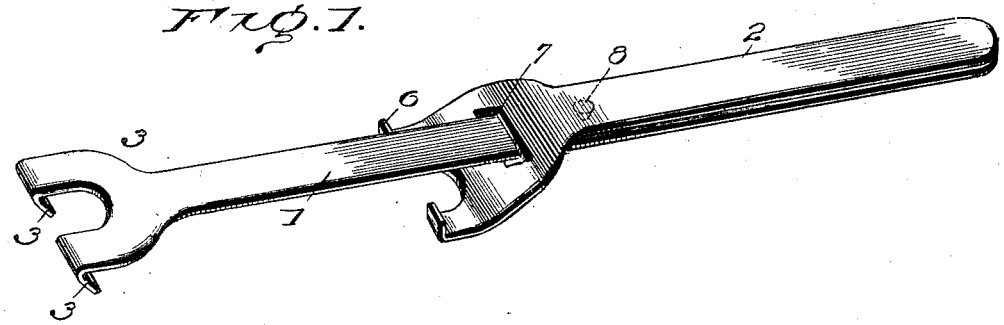
Figure 2:
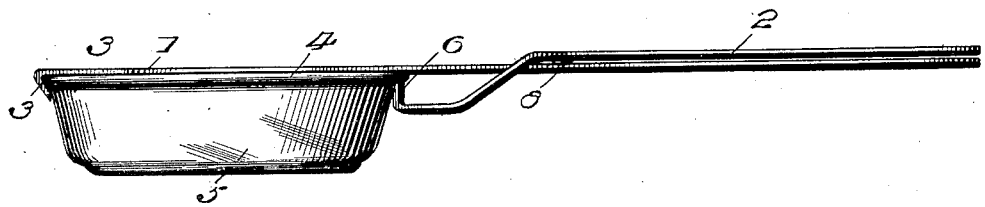
Figure 3:
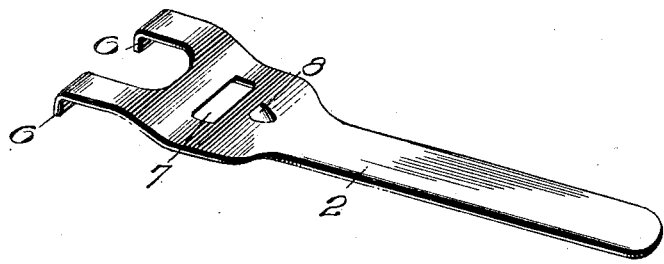

Figure 1 is a perspective view of the lifter. Fig. 2 is an edge view showing the lifter applied to a hand. Fig. 3 is a perspective view of the slidable member inverted.

Corresponding and like parts are referred to in the following description and indicated in all the views of the drawings by the same reference characters.

The lifter comprises, essentially, two members 1 and 2, the member 1 being fixed and the member 2 slidable thereon to admit of adapting the lifter to pans, plates, and cooking utensils of varying sizes. The fixed member is provided at one end with a bent portion 3, forming a hook to engage over the rim or bead 4 of a pan 5 or analogous article. The engaging end of the member 1 is widened and notched, forming, in effect, a fork the prongs of which are bent, as shown at 3, to form hooks for engagement with the rim of the pan at separated points, so as to prevent slipping of the holder when properly applied to the pan.

The member 2 is of less length than the member 1, and its inner end is widened and notched to form a fork corresponding to the fork at the engaging end of the member 1. The prongs of the forks are bent upwardly, as shown at 6, for engagement with the under side of the rim or bead 5 of the pan or other article to which the lifter or holder is applied. The engaging end portion of the slidable member is offset to admit of the terminal portion coming below the member 1, which is necessary in order that the bent portion 6 may engage under the rim or bead 4. A slot or opening 7 is formed in the widened portion of the slidable member 2 at the point of deflection for the admission of the stem of the fixed member 1. The stem of the slidable member 2 rests upon the stem of the fixed member when the lifter is in operation, as shown most clearly in Fig. 2, and in order to prevent slipping of the members 1 and 2 a projection 8 is provided on the under side of the slidable member near the slot or opening 7 and acts as a fulcrum for the slidable member to turn upon when the stems of the members 1 and 2 are brought together. The friction and binding caused by interposing the projection 8 between the two members are sufficient to prevent slipping thereof when the stems of the members are brought together. This projection 8 may be provided in any way and is preferably formed by pressing a portion from the body of the member 2.

When in use, the fixed member 1 extends over the pan, plate, or cooking utensil and rests upon the rim at diametrically opposite points, the bent portion 3 engaging under the rim or body 4. The slidable member 2 is moved upon the stem of the fixed member so as to bring its bent portion 6 beneath the rim or bead 4, the latter being held between the said bent portion 3 and the stem of the fixed member 1. The members are adjusted so as to clamp the pan between their bent ends, and the bent portions engaging with the sides or rim of the pan upon opposite sides of a diametrical line slipping of the lifter or holder is prevented, as will be readily comprehended, and the pan or kindred article may be handled and manipulated in the same manner as if the lifter were rigidly attached thereto or formed a permanent part thereof.

Having thus described the invention, what is claimed as new is—

1. A lifter for pans and the like, the same comprising a fixed member having the terminal portion of its engaging end downwardly bent, and a second member slidable upon the fixed member and having its engaging end portion offset and provided with an opening about in line with the point of deflection of the offset part for the reception of the stem of the fixed member and having the end of the offset portion upwardly bent, substantially as set forth.

2. A lifter for pans and the like comprising a fixed member, and a second member slidable thereon and having its engaging end portion offset so as to come below the fixed member, the slidable member having a projection on the side adjacent to the fixed member for engagement therewith to prevent slipping when the stems of the members are brought together, substantially as set forth.

3. The herein-described lifter for pans and the like, comprising a fixed member having a fork at its engaging end with the terminals of its prongs downwardly bent, and a second member slidable upon the fixed member having its inner end widened and formed with an opening to receive the stem of the fixed member and having the widened end terminating in a fork with the extremities of the prongs upwardly bent, said widened end being offset to throw the fork below the fixed member, and the slidable member having a projection near the opening therein to come between the stems of the two members, substantially as and for the purpose set forth.

In testimony whereof we affix our signatures in presence of two witnesses.

ISAAC J. MURPHY. [L. S.]
  WILLIAM H. MURPHY. [L. S.]

Witnesses:
  R. S. McCRUM,
  J. VANCE GRAFT.